Figure 1:
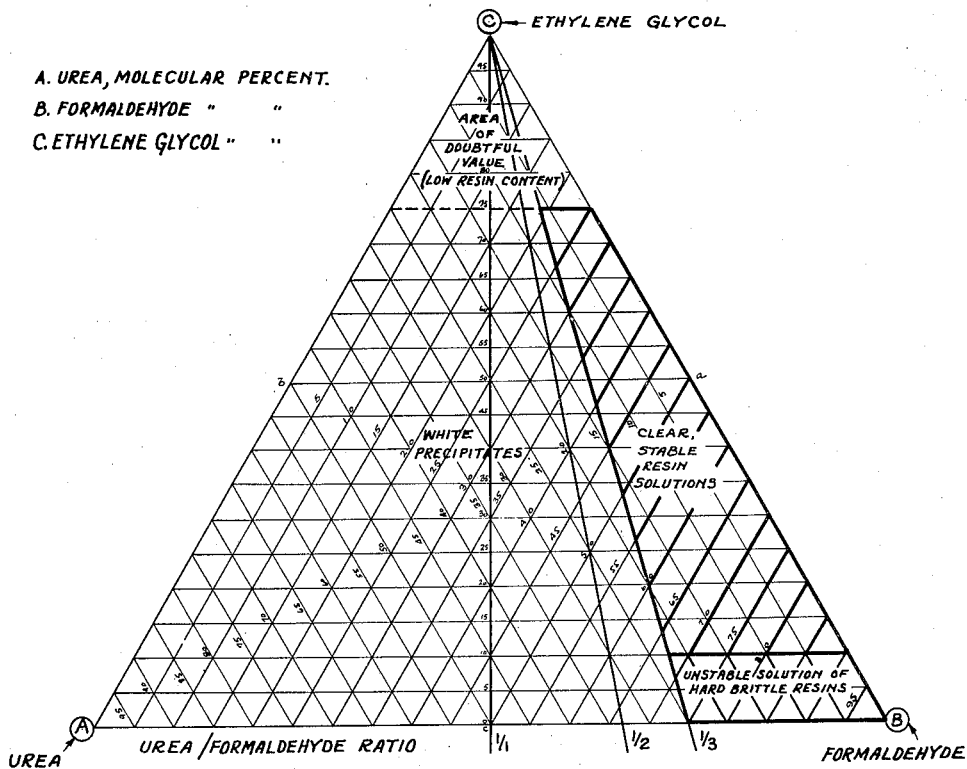

Dec. 26, 1939.  T. S. HODGINS ET AL  2,185,167

WATER-SOLUBLE UREA-FORMALDEHYDE ETHYLENE GLYCOL CONDENSATION PRODUCTS

Filed April 20, 1938

Inventor
THEODORE S. HODGINS and
ALMON G. HOVEY.

By Munson H. Lane
Attorney

Patented Dec. 26, 1939

2,185,167

UNITED STATES PATENT OFFICE 2,185,167

WATER-SOLUBLE UREA - FORMALDEHYDE ETHYLENE GLYCOL CONDENSATION PRODUCTS

Theodore S. Hodgins, Detroit, and Almon G. Hovey, Pleasant Ridge, Mich., assignors, by mesne assignments, to Reichhold Chemicals, Inc., Detroit, Mich., a corporation of Delaware Application April 20, 1938, Serial No. 203,148

2 Claims. (Cl. 260—70)

The invention relates to the manufacture of stable water-soluble resins of the urea-formaldehyde type particularly intended for use in aqueous solution for such purposes as film forming, impregnation of fabrics, etc. The resins produced according to our invention are formed by reacting urea, formaldehyde and ethylene glycol under special reacting conditions and the product of such reaction we have found differs widely in its characteristics from any previously known in the art.

Practically all of the water-soluble urea-formaldehyde products which have been described hithertofore are characterized by the relatively high instability in solution with the result that in a comparatively short time white precipitates or gels form, rendering the products useless except for immediate use. By the method which we describe useful urea-formaldehyde products may be prepared and kept stable for long periods of time. The advantages of these products are obvious. For example, standard uniform products can now be made on a large scale and in an economical fashion by a resin manufacturer and shipped to all parts of the world instead of being made on the job in small quantities with varying properties just before using. Furthermore, prior to our invention, if any unexpected delay in the use of the product caused by a shut-down of the factory, occurred the old unstable urea-formaldehyde solutions might spoil before they could be used up.

We have discovered that the urea-formaldehyde condensation mechanism which takes place in a slightly alkaline medium is desirably stabilized by modification with the formals of ethylene glycol. In a practical way this is accomplished by the simultaneous reaction of 1 mol of urea and 2 mols of formaldehyde to form dimethylol urea and 1 mol of formaldehyde and 1 to 2 mols of ethylene glycol to form the ethylene glycol formals, the dimethylol urea and the formals then reacting to form the stable complexes which are characterized not only by their water-whiteness, heat-hardening characteristics, but particularly by their stability in aqueous solution.

These new stable interaction products obtained by reaction of urea, formaldehyde and of ethylene glycol in the presence of the specific catalysts are not to be confused with the ordinary urea-formaldehyde condensation products which have been formed first and the polyhydric alcohol added as a plasticizer after the resin has been formed. Such products are not only quite unstable alone, but also the addition of the polyhydric alcohol tends to cause precipitation to take place even earlier than if it were not added.

We have found that there is a very definite and limited range of composition which gives resin solutions of stable keeping qualities. When the number of reacting mols of urea, ethylene glycol and of formaldehyde are plotted on a triaxial diagram (see Figure 1), there is a very definite area in which clear, colorless, useful, stable products are obtained, surrounded by areas where a characteristic white precipitate forms with varying degrees of rapidity, rendering the products useless for commercial exploitation.

A few of the points used in locating the area shown in Figure 1 are derived from the following list, which gives some general examples of how the degree of stability varies with change in composition:

Table

| Exp. | Parts by weight | | | | Stability at room temperature | |
|---|---|---|---|---|---|---|
| | Urea | Formaldehyde (37%) | Ethylene glycol | NH$_4$OH (26%) | 2 weeks | 4 months |
| 601 | 60 | 81 | 0 | 5 | White ppt | White ppt. |
| 602 | 60 | 81 | 62 | 5 | ----do---- | Do. |
| 598 | 60 | 162 | 0 | 5 | ----do---- | Do. |
| 599 | 60 | 162 | 21 | 5 | ----do---- | Do. |
| 600 | 60 | 162 | 46 | 5 | ----do---- | Do. |
| 596 | 60 | 243 | 0 | 5 | O. K. | Solid white ppt. |
| 591 | 60 | 243 | 25 | 5 | O. K. | Do. |
| 592 | 60 | 243 | 62 | 5 | O. K. | O. K. |
| 593 | 60 | 243 | 124 | 5 | O. K. | O. K. |
| 594 | 60 | 243 | 186 | 5 | O. K. | O. K. |
| 595 | 60 | 243 | 248 | 5 | O. K. | O. K. |
| 597 | 60 | 243 | 744 | 5 | O. K. | O. K. |
| 607 | 60 | 324 | 0 | 5 | O. K. | Solid white ppt. |
| 608 | 60 | 324 | 78 | 5 | O. K. | O. K. |

More complete directions as to how stable solutions of urea-formaldehyde-ethylene gylcol condensation products may be formed are given in the following specific examples which are understood to be illustrative only:

*Example 1*

243 parts by weight of 37% aqueous formaldehyde, 150 parts of water, 62 parts of ethylene glycol, 60 parts of urea, 5 parts of 25% ammonium hydroxide are refluxed 30 minutes at boiling in a glass lined kettle equipped with a reflux condenser steam-water jacket and an agitator. The resulting water-white, stable resin solution is then thinned to the desired non-volatile content and cooled down to room temperature as rapidly as possible in order to maintain a low viscosity and promote penetrating power.

*Example 2*

Formaldehyde (37%) 243 parts by weight, water 150 parts by weight, ethylene glycol 124 parts, urea 60 parts and ammonium hydroxide (26%) 5 parts are reacted under reflux as in Example 1.

While we prefer to employ ammonium hydroxide as a catalyst, we may use other alkaline catalysts which are capable of volatilization. The volatile alkaline catalysts are employed in order that they may be driven off upon the application of heat, so that acid-hardening of the resin may take place by means of the free formic acid (which is present in commercial formaldehyde to the extent of about 0.2%) remaining after decomposition of ammonium formate which is the salt of a weak acid and weak base.

The process described in Examples 1 and 2 is very simple and automatic and does not require elaborate and expensive pH control apparatus.

On account of their transparency, water-white color, heat-hardening characteristics, and non-toxicity materials prepared according to our examples are very desirable for coating and sizing paper, for preparing molded and laminated articles, for rendering fabrics more greaseproof, more creaseproof and increasing the tensile strength. This is especially true of upholstery cloth for automobiles and furniture, wearing apparel, etc.

We claim:

1. A process of preparing water-soluble, water-white, heat-convertible resinous products which comprises simultaneously refluxing 3 mols of aqueous formaldehyde, 150 parts of water, 1—2 mols of ethylene glycol, 1 mol of urea, 5 parts of 26% ammonium hydroxide at boiling temperature for a period of 30 minutes under agitation and cooling, the resulting product being characterized by its stability in solution, the urea, ethylene glycol and formaldehyde constituting the principal reacting ingredients.

2. A process of preparing water-soluble, water-white, heat-convertible resinous products which comprises simultaneously refluxing 3 mols of aqueous formaldehyde, 150 parts of water, 2 mols of ethylene glycol, 1 mol of urea, 5 parts of 26% ammonium hydroxide at boiling temperature for a period of 30 minutes under agitation and cooling, the resulting product being characterized by its stability in solution, the urea, ethylene glycol and formaldehyde constituting the principal reacting ingredients.

THEODORE S. HODGINS.
ALMON G. HOVEY.